US012802524B2

(12) United States Patent
Huke et al.

(10) Patent No.: US 12,802,524 B2
(45) Date of Patent: *Nov. 17, 2026

(54) METHOD OF PROVIDING A USER WITH BETTING STATISTICS

(71) Applicant: AdrenalineIP, Washington, DC (US)

(72) Inventors: Casey Alexander Huke, Washington, DC (US); John Cronin, Jericho, VT (US); Joseph W. Beyers, Saratoga, CA (US); Michael D'Andrea, Burlington, VT (US)

(73) Assignee: AdrenalineIP, Washington, DC (US)

(*) Notice: Subject to any disclaimer, the term of this patent is extended or adjusted under 35 U.S.C. 154(b) by 211 days.

This patent is subject to a terminal disclaimer.

(21) Appl. No.: 18/739,694

(22) Filed: Jun. 11, 2024

(65) Prior Publication Data

US 2024/0331494 A1 Oct. 3, 2024

Related U.S. Application Data

(63) Continuation of application No. 17/523,207, filed on Nov. 10, 2021, now Pat. No. 12,014,596.

(60) Provisional application No. 63/112,879, filed on Nov. 12, 2020.

(51) Int. Cl.

| | |
|---|---|
| ***G07F 17/32*** | (2006.01) |
| ***G06N 20/00*** | (2019.01) |
| ***G06Q 50/34*** | (2012.01) |

(52) U.S. Cl.

CPC ........... *G07F 17/323* (2013.01); *G06N 20/00* (2019.01); *G06Q 50/34* (2013.01); *G07F 17/3237* (2013.01); *G07F 17/3288* (2013.01)

(58) Field of Classification Search

CPC ............... G07F 17/323; G07F 17/3237; G07F 17/3288; G06N 20/00; G06Q 50/34

USPC ............................................................ 463/25

See application file for complete search history.

(56) References Cited

U.S. PATENT DOCUMENTS

| | | | | |
|---|---|---|---|---|
| 10,916,103 | B2 * | 2/2021 | Shore | G07F 17/3241 |
| 11,123,644 | B2 * | 9/2021 | Amaitis | A63F 13/792 |
| 11,282,343 | B2 * | 3/2022 | Shore | G07F 17/3237 |
| 2002/0022773 | A1 | 2/2002 | Drinan et al. | |
| 2011/0014974 | A1 * | 1/2011 | Torf | G07F 17/3288 463/25 |
| 2012/0009984 | A1 * | 1/2012 | Amaitis | A63F 13/828 463/4 |
| 2012/0115585 | A1 | 5/2012 | Goldman et al. | |

(Continued)

FOREIGN PATENT DOCUMENTS

WO 2016201515 A1 12/2016

OTHER PUBLICATIONS

International Search Report and Written Opinion issued on Feb. 3, 2022, in connection with corresponding International Patent Application No. PCT/US2021/059090; 8 pages.

*Primary Examiner* — Pierre E Elisca

(74) *Attorney, Agent, or Firm* — Maier & Maier, PLLC

(57) ABSTRACT

A method of providing usable data to a user of a play-by-play sports wagering network about the user's historical wagering plays similar to a currently open wagering market. For example, the number of times the user has bet on that play type or the user's success rate for that play type. The data could be anonymous. The statistics presented could be the betting statistics of all users or the user's betting statistics.

13 Claims, 3 Drawing Sheets

(56) References Cited

U.S. PATENT DOCUMENTS

Figure 1:
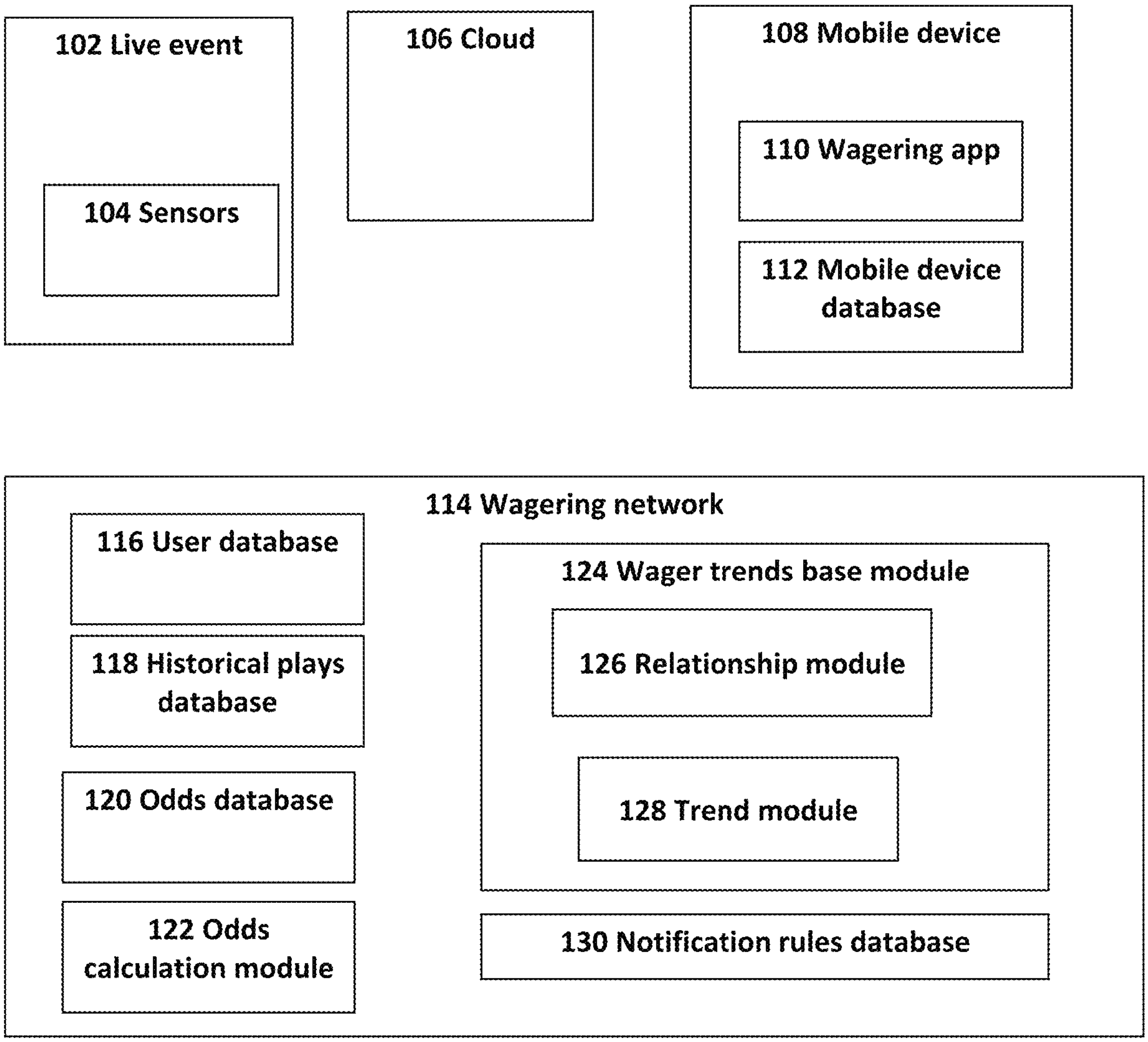

| | | | | |
|---|---|---|---|---|
| 2015/0141101 | A1* | 5/2015 | Amaitis ................ | A63F 13/792<br>463/4 |
| 2017/0144073 | A1* | 5/2017 | Amaitis .............. | G07F 17/3237 |
| 2020/0066107 | A1* | 2/2020 | Shore .................. | G07F 17/3288 |
| 2020/0327771 | A1 | 10/2020 | Restivo et al. | |

* cited by examiner

| Relationship Significance Criteria | | | Trend Criteria | | |
|---|---|---|---|---|---|
| Number of Common Characteristics | Number of Historical Wagers in Common | Average Amount of Historical Wagers in Common | Winning Percentage on Historical Wagers in Common | Trend Window | Trend Magnitude |
| 5+ | 10 | > $5 | >75% | Most recent 10% | +/- 25% |
| 4 | 20 | > $10 | | | |
| 3 | 40 | > $15 | | | |
| 2 | 80 | > $20 | | | |
| 1 | 160 | > $25 | | | |

METHOD OF PROVIDING A USER WITH BETTING STATISTICS

CROSS-REFERENCE TO RELATED APPLICATIONS

This application is a Continuation Application of U.S. application Ser. No. 17/523,207, filed on Nov. 10, 2021, which claims the benefit of priority of U.S. Provisional Application No. 63/112,879, filed on Nov. 12, 2020, the entire contents of which are incorporated herein by reference.

FIELD

The present disclosures are generally related to play-by-play wagering on live sporting events.

BACKGROUND

Gamblers often rely on past success or failure in each type of wager to decide what wagers to make. For example, a gambler may have a large percentage of successful wagers on football games, thereby incentivizing them to wager more on football. While playing on a wagering network or wagering application that allows for play-by-play wagering on live sporting events, it is difficult to identify patterns and trends in one's success or failure in wagering on a particular play type because of the numerous types of plays in many different contexts of a game.

Also, in play-by-play wagering, a wagering market may be open for less than thirty seconds between plays. This short market window allows insufficient time to identify the context of the current wagering market and make comparisons to other historically similar situations.

Lastly, it is difficult to identify trends or patterns present in recent wagers in similar situations that indicate a deviation from historical averages or patterns.

Thus, there is a need in the prior art to quickly identify patterns in a user's wagering for play-by-play wagering.

SUMMARY

In various embodiments, methods, systems, and apparatuses for providing a user of a wagering network with betting statistics can be provided. In one embodiment, a method for providing informational statistical data on a sports wagering network can include retrieving wagering market status data from an odds database; identifying users connected to a wagering network; receiving historical wager data from a relationship module; receiving a notification from a trend module and delivering the notification to a mobile device; identifying a cohort of wagers with characteristics similar to a current wagering market; determining if wagers exceed a predetermined similarity threshold by comparing the characteristics of the cohort of wagers to a notification rules database; and identifying a trend in the cohort of historical wagers by comparing statistics of the cohort of historical wagers to statistics of a recent subset of wagers in the cohort.

In another embodiment, a system for providing informational statistical data on a sports wagering network can include a wager trends base module configured to retrieve open market wager data, prompt at least one relationship module and trend module, and deliver a notification to a mobile device; a relationship module configured to retrieve historical wager data from a user database, identify common characteristics of wagers, and send related wagers to the wager trends base module; a trend module configured to identify trends in a cohort of historical wagers by comparing statistics of the historical wagers to statistics of a recent subset of wagers in the cohort; a notification rules database configured to store at least one relationship significance criteria and trend criteria; and a device configured to display a notification.

BRIEF DESCRIPTIONS OF THE DRAWINGS

The accompanying drawings illustrate various embodiments of systems, methods, and various other aspects of the embodiments. Any person with ordinary art skills will appreciate that the illustrated element boundaries (e.g., boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 1: illustrates a system for providing a user with betting statistics, according to an embodiment.

Figure 2:
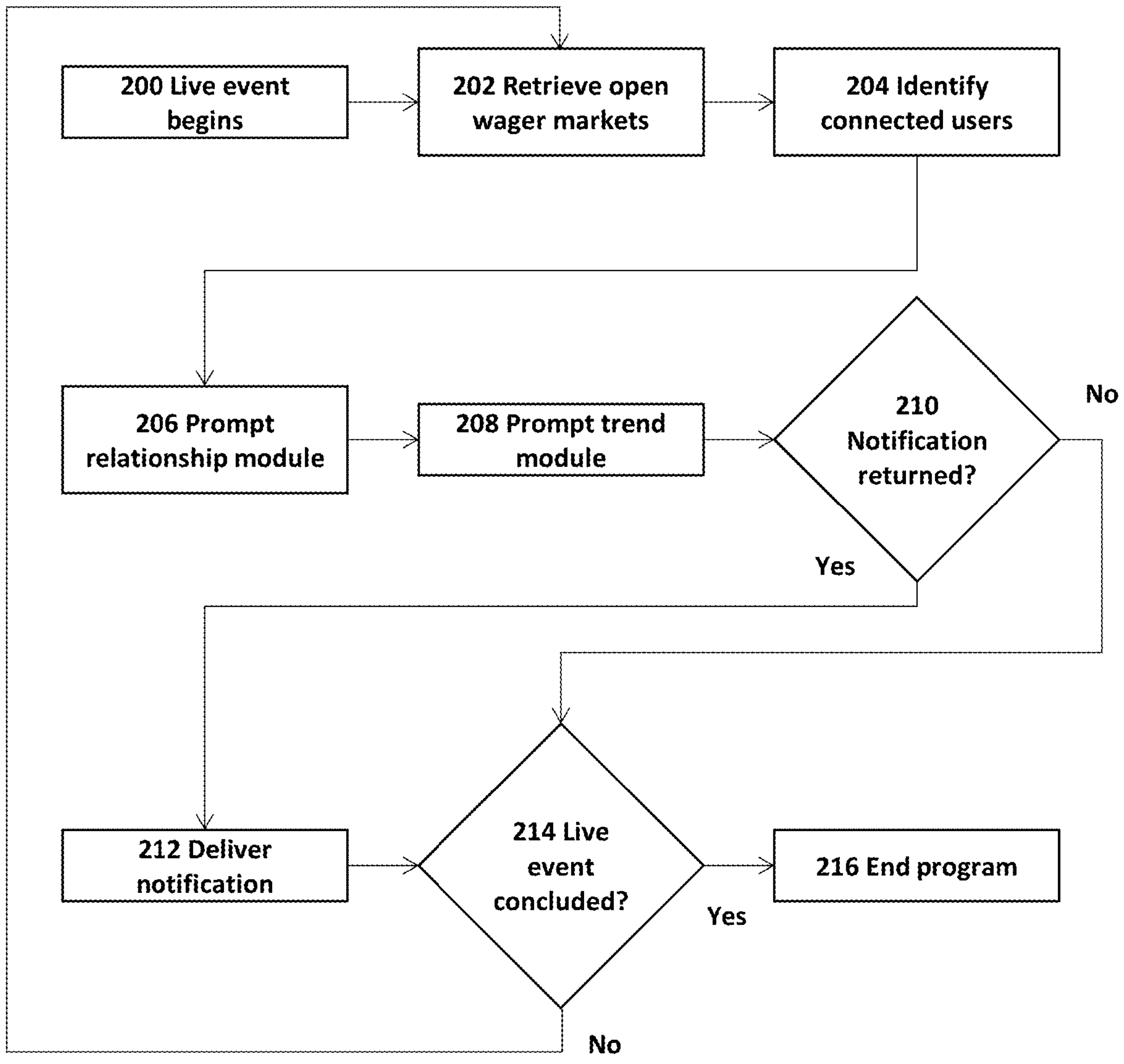

FIG. 2: illustrates a wager trends base module, according to an embodiment.

Figure 3:
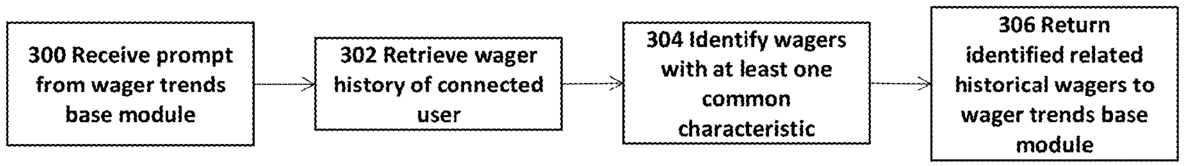

FIG. 3: illustrates a relationship module, according to an embodiment.

Figures 4, 5:
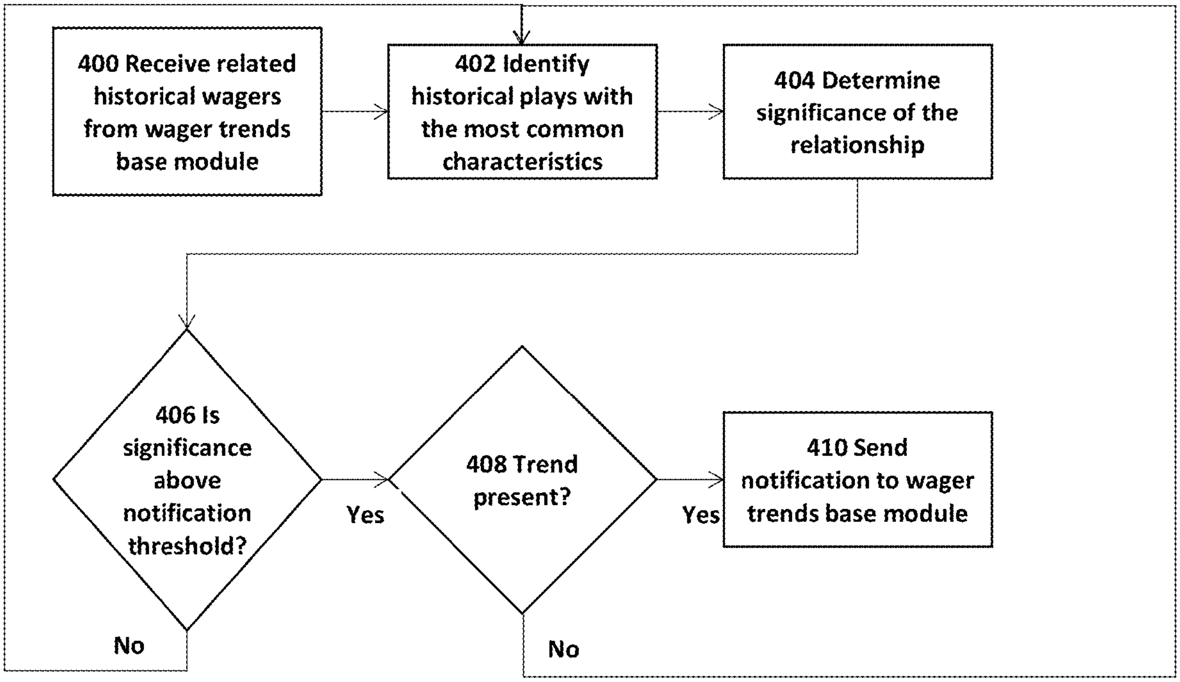

FIG. 4: illustrates a trend module, according to an embodiment.

FIG. 5: illustrates a notification rules database, according to an embodiment.

DETAILED DESCRIPTION

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word exemplary means serving as an example, instance or illustration. The embodiments described herein are not limiting, but rather are exemplary only. The described embodiments are not necessarily to be construed as preferred or advantageous over other embodiments. Moreover, the terms embodiments of the invention, embodiments, or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that specific circuits can perform the various sequence of actions described herein (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in several different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of the terminology used herein is provided.

An action refers to a specific play or specific movement in a sporting event. For example, an action may determine which players were involved during a sporting event. In some embodiments, an action may be a throw, shot, pass, swing, kick, and/or hit performed by a participant in a sporting event. In some embodiments, an action may be a strategic decision made by a participant in the sporting event, such as a player, coach, management, etc. In some embodiments, an action may be a penalty, foul, or other type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity based on the outcome of a future event, such as the results of a game or event. It may be understood that non-monetary items may be the subject of a "bet" or "wager" as well, such as points or anything else that can be quantified for a "bet" or "wager." A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be made for certain amount or for a future time. A "bet" or "wager" can be made for being able to answer a question correctly. A "bet" or "wager" can be made within a certain period. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain to place bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example, up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sportsbook has reduced its betting limits, usually because of weather or the uncertain status of injured players, is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides," "favorite," "chalk," "circled game," "laying the points price," "dog," and "underdog" can be integrated into the embodiments in a variety of manners.

The "money line" refers to the odds expressed in terms of money. With money odds, whenever there is a minus (−), the player "lays" or is "laying" that amount to win (for example, $100); where there is a plus (+), the player wins that amount for every $100 wagered. A "straight bet" refers to an individual wager on a game or event that will be determined by a point spread or money line. The term "straight-up" means winning the game without any regard to the "point spread," a "money-line" bet. "Money line," "straight bet," and "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread." A handicap of the "point spread" value is given to the favorite team so bettors can choose sides at equal odds. "Cover the spread" means that a favorite wins an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread." The "opening line" means the earliest line posted for a particular sporting event or game. The term "pick" or "pick 'em" refers to a game when neither team is favored in an event or game. "Line," "cover the spread," "cover," "tie," "pick," and "pick-em" can be integrated into the embodiments in a variety of manners.

To "middle" means to win both sides of a game; wagering on the "underdog" at one point spread and the favorite at a different point spread and winning both sides. For example, if the player bets the underdog+4½ and the favorite-3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. The event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total," "over," and "under" can be integrated into the embodiments in a variety of manners.

A "parlay" is a single bet that links together two or more wagers; to win the bet, the player must win all the wagers in the "parlay." If the player loses one wager, the player loses the entire bet. However, if they win all the wagers in the "parlay," the player receives a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay," "round robin," "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games, and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events. Typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both pitchers scheduled to start a game start. If they do not, the bet is deemed "no action" and refunded. The "run line" in baseball refers to a spread used instead of the money line. "Listed pitchers," "no action," and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle," "juice," vigorish," "vig," and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations, or individuals that would deploy, for fees, and may be part of, or perform, various system elements or method steps in the embodiments.

Managed service user interface service is a service that can help customers (1) manage third parties, (2) develop the web, (3) perform data analytics, (4) connect thru application program interfaces and (4) track and report on player behaviors. A managed service user interface can be integrated into the embodiments in a variety of manners.

Managed service risk management service are services that assist customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling, and (4) customer service assistance. These managed service compliance services can be integrated into the embodiments in a variety of manners.

Managed service pricing and trading service is a service that helps customers with (1) official data feeds, (2) data visualization, and (3) land based on property digital signage. These managed service pricing and trading services can be integrated into the embodiments in a variety of manners.

Managed service and technology platforms are services that help customers with (1) web hosting, (2) IT support, and (3) player account platform support. These managed service and technology platform services can be integrated into the embodiments in a variety of manners.

Managed service and marketing support services are services that help customers (1) acquire and retain clients and users, (2) provide for bonusing options, and (3) develop press release content generation. These managed service and marketing support services can be integrated into the embodiments in a variety of manners.

Payment processing services are services that help customers with (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat players to free bets, odds boosts, enhanced access, and flexible cash-back to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by always managing commission and availability. The "cash out" or "pay out" or "payout" can be integrated into the embodiments in a variety of manners, including both monetary and non-monetary payouts, such as points, prizes, promotional or discount codes, and the like.

"Customized betting" allows customers to have tailored personalized betting experiences with sophisticated tracking and analysis of players' behavior. "Customized betting" can be integrated into the embodiments in a variety of manners.

Kiosks are devices that offer interactions with customers, clients, and users with a wide range of modular solutions for both retail and online sports gaming. Kiosks can be integrated into the embodiments in a variety of manners.

Business Applications are an integrated suite of tools for customers to manage the everyday activities that drive sales, profit, and growth by creating and delivering actionable insights on performance to help customers to manage the sports gaming. Business Applications can be integrated into the embodiments in a variety of manners.

State-based integration allows for a given sports gambling game to be modified by states in the United States or other countries, based upon the state the player is in, mobile phone, or other geolocation identification means. State-based integration can be integrated into the embodiments in a variety of manners.

Game Configurator allows for configuration of customer operators to have the opportunity to apply various chosen or newly created business rules on the game as well as to parametrize risk management. The Game Configurator can be integrated into the embodiments in a variety of manners.

"Fantasy sports connectors" are software connectors between method steps or system elements in the embodiments that can integrate fantasy sports. Fantasy sports allow a competition in which participants select imaginary teams from among the players in a league and score points according to the actual performance of their players. For example, if a player in fantasy sports is playing at a given real-time sport, odds could be changed in the real-time sports for that player.

Software as a service (or SaaS) is a software delivery and licensing method in which software is accessed online via a subscription rather than bought and installed on individual computers. Software as a service can be integrated into the embodiments in a variety of manners.

Synchronization of screens means synchronizing bets and results between devices, such as TV and mobile, PC, and wearables. Synchronization of screens can be integrated into the embodiments in a variety of manners.

Automatic content recognition (ACR) is an identification technology that recognizes content played on a media device or present in a media file. Devices containing ACR support enable users to quickly obtain additional information about the content they see without any user-based input or search efforts. A short media clip (audio, video, or both) is selected to start the recognition. This clip could be selected from within a media file or recorded by a device. Through algorithms such as fingerprinting, information from the actual perceptual content is taken and compared to a database of reference fingerprints, wherein each reference fingerprint corresponds with a known recorded work. A database may contain metadata about the work and associated information, including complementary media. If the media clip's fingerprint is matched, the identification software returns the corresponding metadata to the client application. For example, during an in-play sports game, a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet"—which is a computer-generated data point—is placed above the player that is bet on. Augmented reality can be integrated into the embodiments in a variety of manners.

Some embodiments of this disclosure, illustrating all its features, will now be discussed in detail. It can be understood that the embodiments are intended to be open-ended in that an item or items used in the embodiments is not meant to be an exhaustive listing of such item or items or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

FIG. 1 is a system for providing a user with betting statistics. This system may include a live event 102, for example, a sporting event such as a football, basketball, baseball, or hockey game, tennis match, golf tournament, eSports, or digital game, etc. The live event 102 may include some number of actions or plays, upon which a user, bettor, or customer can place a bet or wager, typically through an entity called a sportsbook. There are numerous types of wagers the bettor can make, including, but not limited to, a straight bet, a money line bet, or a bet with a point spread or line that the bettor's team would need to cover if the result of the game with the same as the point spread the user would not cover the spread, but instead the tie is called a push. If the user bets on the favorite, points are given to the opposing side, which is the underdog or longshot. Betting on all favorites is referred to as chalk and is typically applied to round-robin or other tournaments' styles. There are other types of wagers, including, but not limited to, parlays, teasers, and prop bets, which are added games that often allow the user to customize their betting by changing the odds and payouts received on a wager. Certain sportsbooks will allow the bettor to buy points which moves the point spread off the opening line. This increases the price of the bet, sometimes by increasing the juice, vig, or hold that the sportsbook takes. Another type of wager the bettor can make is an over/under, in which the user bets over or under a total for the live event 102, such as the score of an American football game or the run line in a baseball game, or a series of actions in the live event 102. Sportsbooks have several bets they can handle, limiting the number of wagers they can take on either side of a bet before they will move the line or odds off the opening line. Additionally, there are circumstances, such as an injury to an important player like a listed pitcher, in which a sportsbook, casino, or racino may take an available wager off the board. As the line moves, an opportunity may arise for a bettor to bet on both sides at different point spreads to middle, and win, both bets. Sportsbooks will often offer bets on portions of games, such as first-half bets and half-time bets. Additionally, the sportsbook can offer futures bets on live events in the future. Sportsbooks need to offer payment processing services to cash out customers which can be done at kiosks at the live event 102 or at another location.

Further, embodiments may include a plurality of sensors 104 that may be used such as motion, temperature, or humidity sensors, optical sensors, and cameras such as an RGB-D camera which is a digital camera capable of capturing color (RGB) and depth information for every pixel in an image, microphones, radiofrequency receivers, thermal imagers, radar devices, lidar devices, ultrasound devices, speakers, wearable devices, etc. Also, the plurality of sensors 104 may include but are not limited to, tracking devices, such as RFID tags, GPS chips, or other such devices embedded on uniforms, in equipment, in the field of play and boundaries of the field of play, or on other markers in the field of play. Imaging devices may also be used as tracking devices, such as player tracking, which provide statistical information through real-time X, Y positioning of players and X, Y, Z positioning of the ball.

Further, embodiments may include a cloud 106 or a communication network that may be a wired and/or wireless network. The communication network, if wireless, may be implemented using communication techniques such as visible light communication (VLC), worldwide interoperability for microwave access (WiMAX), long term evolution (LTE), wireless local area network (WLAN), infrared (IR) communication, public switched telephone network (PSTN), radio waves, or other communication techniques that are known in the art. The communication network may allow ubiquitous access to shared pools of configurable system resources and higher-level services that can be rapidly provisioned with minimal management effort, often over the internet, and relies on sharing resources to achieve coherence and economies of scale, like a public utility. In contrast, third-party clouds allow organizations to focus on their core businesses instead of expending resources on computer infrastructure and maintenance. The cloud 106 may be communicatively coupled to a peer-to-peer wagering network 114, which may perform real-time analysis on the type of play and the result of the play. The cloud 106 may also be synchronized with game situational data such as the time of the game, the score, location on the field, weather conditions, and the like, which may affect the choice of play utilized. For example, in an exemplary embodiment, the cloud 106 may not receive data gathered from the sensors 104 and may, instead, receive data from an alternative data feed, such as Sports Radar®. This data may be compiled substantially immediately following the completion of any play and may be compared with a variety of team data and league data based on a variety of elements, including the current down, possession, score, time, team, and so forth, as described in various exemplary embodiments herein.

Further, embodiments may include a mobile device 108 such as a computing device, laptop, smartphone, tablet, computer, smart speaker, or I/O devices. I/O devices may be present in the computing device. Input devices may include but are not limited to, keyboards, mice, trackpads, trackballs, touchpads, touch mice, multi-touch touchpads and touch mice, microphones, multi-array microphones, drawing tablets, cameras, single-lens reflex cameras (SLRs), digital SLRs (DSLRs), complementary metal-oxide semiconductor (CMOS) sensors, accelerometers, IR optical sensors, pressure sensors, magnetometer sensors, angular rate sensors, depth sensors, proximity sensors, ambient light sensors, gyroscopic sensors, or other sensors. Output devices may include but are not limited to, video displays, graphical displays, speakers, headphones, inkjet printers, laser printers, or 3D printers. Devices may include, but are not limited to, a combination of multiple input or output devices such as, Microsoft KINECT, Nintendo Wii remote, Nintendo WII U GAMEPAD, or Apple iPhone. Some devices allow gesture recognition inputs by combining input and output devices. Other devices allow for facial recognition, which may be utilized as an input for different purposes such as authentication or other commands. Some devices provide for voice recognition and inputs including, but not limited to, Microsoft KINECT, SIRI for iPhone by Apple, Google Now, or Google Voice Search. Additional user devices have both input and output capabilities including but not limited to, haptic feedback devices, touchscreen displays, or multi-touch displays. Touchscreen, multi-touch displays, touchpads, touch mice, or other touch sensing devices may use different technologies to sense touch, including but not limited to, capacitive, surface capacitive, projected capacitive touch (PCT), in-cell capacitive, resistive, IR, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, but not limited to, pinch, spread, rotate, scroll, or other gestures. Some touchscreen devices, including but not limited to, Microsoft PIXELSENSE or Multi-Touch Collaboration Wall, may have larger surfaces, such as on a table-top or on a wall, and may also interact with other electronic devices. Some I/O devices, display devices, or groups of devices may be augmented reality devices. An I/O controller may control one or more I/O devices, such as a keyboard and a pointing device, or a mouse or optical pen. Furthermore, an I/O device may also contain storage and/or an installation medium for the computing device. In some embodiments, the computing device may include USB connections (not shown) to receive handheld USB storage devices. In further embodiments, an I/O device may be a bridge between the system bus and an external communication bus, e.g., USB, SCSI, Fire Wire, Ethernet, Gigabit Ethernet, Fiber Channel, or Thunderbolt buses. In some embodiments, the mobile device 108 could be an optional component and would be utilized in a situation where a paired wearable device employs the mobile device 108 for additional memory or computing power or connection to the internet.

Further, embodiments may include a wagering software application or a wagering app 110, which is a program that enables the user to place bets on individual plays in the live event 102, streams audio and video from the live event 102, and features the available wagers from the live event 102 on the mobile device 108. The wagering app 110 allows the user to interact with the wagering network 114 to place bets and provide payment/receive funds based on wager outcomes.

Further, embodiments may include a mobile device database 112 that may store some or all the user's data, the live event 102, or the user's interaction with the wagering network 114.

Further, embodiments may include the wagering network 114, which may perform real-time analysis on the type of play and the result of a play or action. The wagering network 114 (or the cloud 106) may also be synchronized with game situational data, such as the time of the game, the score, location on the field, weather conditions, and the like, which may affect the choice of play utilized. For example, in an exemplary embodiment, the wagering network 114 may not receive data gathered from the sensors 104 and may, instead, receive data from an alternative data feed, such as SportsRadar®. This data may be provided substantially immediately following the completion of any play and may be compared with a variety of team data and league data based on a variety of elements, including the current down, possession, score, time, team, and so forth, as described in various exemplary embodiments herein. The wagering network 114 can offer several SaaS managed services such as user interface service, risk management service, compliance, pricing and trading service, IT support of the technology platform, business applications, game configuration, state-based integration, fantasy sports connection, integration to allow the joining of social media, or marketing support services that can deliver engaging promotions to the user.

Further, embodiments may include a user database 116, which may contain data relevant to all users of the wagering network 114 and may include, but is not limited to, a user ID, a device identifier, a paired device identifier, wagering history, or wallet information for the user. The user database 116 may also contain a list of user account records associated with respective user IDs. For example, a user account record may include, but is not limited to, information such as user interests, user personal details such as age, mobile number, etc., previously played sporting events, highest wager, favorite sporting event, or current user balance and standings. In addition, the user database 116 may contain betting lines and search queries. The user database 116 may be searched based on a search criterion received from the user. Each betting line may include but is not limited to, a plurality of betting attributes such as at least one of the following: the live event 102, a team, a player, an amount of wager, etc. The user database 116 may include, but is not limited to, information related to all the users involved in the live event 102. In one exemplary embodiment, the user database 116 may include information for generating a user authenticity report and a wagering verification report. Further, the user database 116 may be used to store user statistics like, but not limited to, the retention period for a particular user, frequency of wagers placed by a particular user, the average amount of wager placed by each user, etc.

Further, embodiments may include a historical plays database 118 that may contain play data for the type of sport being played in the live event 102. For example, in American Football, for optimal odds calculation, the historical play data may include metadata about the historical plays, such as time, location, weather, previous plays, opponent, physiological data, etc.

Further, embodiments may utilize an odds database 120—that may contain the odds calculated by an odds calculation module 122—to display the odds on the user's mobile device 108 and take bets from the user through the mobile device wagering app 110.

Further, embodiments may include the odds calculation module 122, which may utilize historical play data to calculate odds for in-play wagers.

Further, embodiments may include a wager trends base module 124, which may present the user with information related to characteristics, trends within those characteristics, and their wagering history related to at least one open wagering market on the current play in the live event 102. The wager trends base module 124 may prompt the relationship module 126 when a user is connected to the wagering network 114, and at least one wagering market is open in the odds database 120. The relationship module 126 may return related characteristics of the open wagering markets to characteristics of the user's wagering history. The characteristics of the open wagering market may include one or more of the teams involved, the down, distance, position on the field, one or more players involved in the current play, the score, the time remaining, the weather, etc. For example, it may be 3rd and three, with 1:50 to go in the second quarter the American football game between the Detroit Lions and the Green Bay Packers, with the Packers on offense, and the open wagering market is on the play being a run versus a pass. The relationship module 126 may return the wagering history for the user related to wagers on the Packers, wagers in the last two minutes of a half, wagers on the play being a run versus a pass, wagers involving Aaron Rogers at quarterback, etc. The received relationship may then be sent to the trend module 128 to determine the significance of the relationship between the characteristics of the wagering market and the characteristics of the user's wager history. The significance of the relationship may be based on the amount of money wagered on a wagering market with at least one shared characteristic of the current wagering market. The relationship may also be based on the number of wagers, the timing of wagers, the pattern of wagers, etc. Suppose the relationship between the user's wagering history and the current wagering market is above a threshold. In that case, a notification may be sent to the user indicating a statistic or trend in their wagering history is related to the current wagering market. The notification may be provided in the form of displayed information, sound or audio information, or haptics information, as desired. For example, the user may be notified that they have won 70% of wagers they have made on a pass inside the last two minutes of a half.

Further, embodiments may include a relationship module 126, which may identify characteristics of the current wagering market and retrieve from the user database 116 any of the historical wagers made by the current user that have at least one characteristic in common with the current wagering market. The identified related wagers may then be sent to the wager trends base module 124.

Further, embodiments may include a trend module 128, which may determine the significance of the relationship between the identified historical wagers of the current user and the current wagering market.

Further, embodiments may include a notification rules database 130, which may contain the criteria in which a notification containing data related to their wagering history's relationship to the current wagering market may be delivered to a user.

FIG. 2 illustrates the wager trends base module 124. The process may begin with the live event 102 beginning at step 200. The open wagering markets may then be retrieved at step 202 from the odds database 120. The users connected to the wagering network 114 may be identified at step 204. The relationship module 126 may then be prompted at step 206. Once the relationship module 126 has returned some number of historical wagers by the user with at least one characteristic in common with the currently open wagering market, the trend module 128 may be prompted at step 208. The wager trends base module 124 may determine, at step 210, if a notification has been returned by the trend module 128. If no notification was returned, the process may proceed to step 214. If a notification was received at step 210, that notification may be delivered at step 212 to the user's mobile device 108. This notification may be in the form of a pop-up or banner in the wagering app 110. The notification may include the user's historical winning percentage on similar wagers displayed next to a given wagering option. For example, the user may be shown that they have a won 80% of the wagers they have made on the Green Bay Packers passing on a play that takes place in their opponent's red zone with less than two minutes to go in a half. The notification may also include representing a trend in the identified historic wagers similar to the current wagering market. For example, the user may have only a 34% winning percentage on historically similar wagers, but their last five such wagers have a 60% winning percentage. This trend in results may be represented as a green upwards-facing arrow.

The size, shade, movement, or shape of the representation may vary based on the wager type, the magnitude of the trend, the sample size, etc. The wager trends base module 124 may determine at step 214 if the live event 102 has concluded. If the live event 102 has not concluded, the process may return to step 202. If the live event 102 has concluded, the process may end at step 216.

FIG. 3 illustrates the relationship module 126. The process may begin with the relationship module 126 receiving, at step 300, a prompt from the wager trends base module 124 indicating there is at least one user connected to the wagering network 114 and there is at least one currently open wagering market in the odds database 120. The relationship module 126 may retrieve, at step 302, the identified connected user(s) wagering history from the user database 116. The relationship module 126 may identify, at step 304, wagers made by the identified user with at least one characteristic in common with the currently open wagering market. For example, related wagers may be previous wagers made on the Green Bay Packers passing plays, wagers made on plays that takes place in their opponent's red zone, wagers made on plays with less than two minutes to go in a half. The relationship module 126 may return, at step 306, related historical wagers to the wagering trends base module 124.

FIG. 4 illustrates the trend module 128. The process may begin with the trend module 128 receiving from the wager trends base module 124, at step 400, historical wagers of a user that share at least one characteristic in common with the current wagering market. The trend module 128 may then identify, at step 402, a cohort of historical wagers with the greatest number of characteristics in common with the current wagering market. For example, the open wagering market is on the play being a run versus a pass on a 3rd and three, with 1:50 to go in the second quarter of an American football game between the Detroit Lions and the Green Bay Packers, with the Packers on offense at the Detroit 15-yard line. A cohort of related wagers may be the historical wagers by the user that were wagered on the play being a pass, for an amount between five and ten dollars, with less than two minutes left in the half, inside the 20-yard line, involving the Packers' offense, the Lions' defense, with Aaron Rogers at Quarterback, between seventy- and eighty-degrees Fahrenheit, with the Packers' trailing in the game by between three and five points. It should be obvious that these are non-limiting examples of characteristics of the play and wager. Characteristics may also include physiological data related to players, telemetry on players, or other related game elements such as the ball, pylon, officials, etc., and characteristics of the wager related to a pattern of wagers. For example, wagers made after a lost wager, wagers made after winning the previous three wagers, etc. The trend module 128 may determine, at step 404, the significance of the relationship between the cohort of identified historical wagers and the current wagering market. The significance of the relationship between the cohort of identified historical wagers and the current wagering market may be the number of common characteristics. For example, a first cohort of historical wagers with two common characteristics may be wagers made on plays that take place in their opponent's red zone and less than two minutes to go in a half. A second cohort of wagers with three common characteristics may be wagers made on plays that takes place in their opponent's red zone and less than two minutes to go in a half, and involve the Green Bay Packers offense. The relationship of the second cohort of plays to the current play may be considered more significant because there are more common characteristics. In another embodiment, the significance of the specificity of the relationship between the characteristics may be used to determine the significance of the relationship. For example, a first common characteristic may be all wagers on plays in the red zone. The red zone is a common American football term for the field inside the opponent's 20-yard line. A second common characteristic may be all plays in the red zone may be all wagers on plays on the 15-yard line exactly. A cohort of plays that took place on the 15-yard line may be considered to have a stronger relationship to the current play than a larger cohort of plays that include all plays inside the 20-yard line. The larger the sample size of historical wagers the system has to evaluate, the more specific the characteristic filter may be. An administrator may set these thresholds, or they may be dynamically determined. For example, an administrator may define one common characteristic as plays inside of the red zone. The system may learn over time that wagers on plays that take place between the opponent's 5-yard line and 20-yard line have many other common characteristics but plays between the goal line and the 5-yard line are related to different types of wagering behavior, either in an individual user or a cohort of users. The trend module 128 may then determine, at step 406, if the significance of the relationship is above a threshold for notification. The significance of the relationship may be determined by comparing the characteristics of the current cohort of wagers to the criteria in the notification rules database 130. In the present example, the identified cohort may fall into a significance level defined by an administrator as historical wagers with five or more characteristics in common with the currently open wagering market. The first notification threshold in this example may be based on the number of wagers in the cohort. A threshold for significance in the current example may be at least ten historical wagers in the cohort with five common characteristics. If the cohort being examined does not meet the minimum number of similar historical wagers, the process may return to step 402 until there is a notification to deliver, or there are no more cohorts to examine. There may be multiple criteria for significance, such as the number of wagers, average wager amount, wager frequency, etc. For example, the trend module 128 may determine that the user has made 50 historic wagers on the Packers passing on plays inside the red zone with less than two minutes to go in the half (four common characteristics) with an average wager amount of $25. These values may be above the relationship significance thresholds for both the number of common characteristics and the average wager amount. When a cohort of historical wagers has been determined to have a relationship with the currently open wagering market above at least one significance threshold, the trend module 128 may then determine, at step 408, if there is a trend present in the identified cohort of historical wagers. One way to identify a trend may be to compare statistics about the entirety of the identified cohort of wagers, such as winning percentage, average wager size, frequency, etc., to those same statistics against a more recent subset of wagers in the cohort. For example, the user's winning percentage on the 50 wagers in the identified cohort of wagers on the Packers passing inside the red zone with less than two minutes remaining in the half may be 80%. This winning percentage may be above the threshold for notification in the notification rules database 130. The user may be delivered a notification of their winning percentage on similar historical wagers to incentivize them to wager on the currently open wagering market or incentivize them to increase their wager by informing them of their past success in these similar types of wagering markets. The user may have a low winning percentage, 30%, on the identified cohort of wagers. In some embodiments, this low of a winning percentage may be criteria for notification to inform the user of wagering markets in which they have historically performed poorly. In the present example, the most recent 10% of wagers in a cohort are compared to the other 90% of wagers to determine if there is a trend present in the cohort of wagers. Keeping with the example of winning percentage as the statistic being examined in the cohort of identified wagers, the user's winning percentage on the identified cohort of 50 wagers is 34% or 17/50. This winning percentage may not be above the threshold for notification in the notification rules database 130. However, the user's winning percentage on the five most recent wagers (60%) in the identified cohort may be compared to the user's winning percentage in the other forty-five wagers (31%). Their recent wagers resulted in a +29% increase in the user's winning percentage, above the threshold for notification in the notification rules database 130. One or more identified notifications may then be sent at step 410 to the wager trends base module 124.

FIG. 5 illustrates the notification rules database 130. The database may contain the criteria for sending a notification to the user regarding a cohort of the user's historic wagers similar to some characteristics of one or more currently open wagering markets. The database may contain several thresholds for the significance of the relationship between the currently open wagering market and the identified cohort of historic wagers. These criteria may include the number of characteristics the identified cohort has in common with the current market, the average amount of the wager, the number of wagers in the identified cohort, winning percentage on the identified wagers, etc. In some embodiments, the relationship significance criteria may be combined. For example, a cohort with five or more characteristics in common with the currently open wagering market may require only ten wagers in the cohort or have an average wager amount greater than five dollars to meet the criteria for a notification to be delivered to the user. At the same time, a cohort with only three characteristics in common with the currently open wagering market may require at least forty wagers to be in the cohort or have an average wager amount greater than fifteen dollars. In the present example, the criteria are static and set by an administrator. The criteria may also be specific to a given user or a cohort of similar users. The criteria may adjust dynamically based on an algorithm examining the users' wagering behavior and their response to the notifications delivered. For example, the system may identify that one cohort of users wagers more when they receive notifications related to wagers with more common characteristics. Another cohort of users wagers more when they receive notifications related to large sample sizes of wagers with fewer characteristics in common with the current wagering market. The notification rules database 130 may also contain notification criteria related to trends identified in a cohort of wagers similar to the current wagering market. The winning percentage on a recent subset of the identified cohort may be compared to the rest of the cohort. For example, the user may receive a notification when they have a winning percentage on the most recent ten percent of wagers in the identified cohort that is at least twenty-five percent higher than the other ninety percent of the identified cohort. The criteria for a notification to be delivered due to an identified trend may be set by an administrator, be specific to users or cohorts of users, and/or be dynamically determined by an algorithm.

The foregoing description and accompanying figures illustrate the principles, preferred embodiments, and modes of operation of the invention. However, the invention should not be construed as being limited to the embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for providing informational statistical data on a sports wagering network using at least one processor and a non-transitory memory, the method comprising:

retrieving wagering market status data from an odds database in a cloud;

identifying users connected to a wagering network in the cloud;

receiving historical wager data from a relationship module in the cloud;

receiving information from a trend module and attaching a trend related to the current wagering market to the wager;

identifying a cohort of wagers on the wagering network with characteristics similar to a current wagering market;

determining, in the cloud, if wagers exceed a predetermined similarity threshold by comparing the characteristics of the cohort of wagers to a notification rules database;

identifying, in the cloud, a trend in the cohort of historical wagers by comparing statistics of the cohort of historical wagers to statistics of a recent subset of wagers in the cohort; and delivering, via the wagering network, a notification to a mobile device based on the identified trend.

2. The method for providing informational statistical data on a sports wagering network of claim 1, wherein the characteristics comprise at least one of user interests, user age, user mobile phone number, current user balance, user standings, user search queries, wagering history of a user, and wagering success of a user.

3. The method for providing informational statistical data on a sports wagering network of claim 1, wherein the characteristics are set by an administrator or are dynamically determined using artificial intelligence.

4. The method for providing informational statistical data on a sports wagering network of claim 1, wherein the similarity threshold is at least one number of characteristics the identified cohort has in common with the current market, average amount of the wager, number of wagers in the identified cohort, and winning percentage on the identified wagers.

5. The method for providing informational statistical data on a sports wagering network of claim 1, wherein the notification rules database uses an algorithm to dynamically adjust criteria for sending notifications based on an analysis of behavior of a user or a cohort of similar users and user response to previously delivered notifications.

6. The method for providing informational statistical data on a sports wagering network of claim 1, wherein the notification rules database lowers the notification thresholds based on a pattern of wager results.

7. The method for providing informational statistical data on a sports wagering network of claim 1, wherein the statistics are at least one of a winning percentage, wager size, and frequency.

8. The method for providing informational statistical data on a sports wagering network of claim 1, wherein the notification is one of displayed information, sound information, or haptics.

9. The method of claim 1, wherein the notification is displayed on the mobile device as at least one of a popup or banner in a wagering application.

10. The method of claim 1, further comprising receiving, at the processor, real-time data from a live sporting event, wherein the odds database is synchronized with the real-time data from the live sporting event.

11. A system for providing informational statistical data on a sports wagering network, comprising:

at least one processor;

a non-transitory memory;

a cloud network;

a wager trends base module stored on the cloud network and configured to cause the processor to retrieve open market wager data, prompt at least one relationship module and trend module, and deliver a notification to a mobile device;

a relationship module stored on the cloud network and configured to cause the processor to retrieve historical wager data from a user database, identify common characteristics of wagers, and send related wagers to the wager trends base module;

a trend module stored on the cloud network and configured to cause the processor to identify trends in a cohort of historical wagers by comparing statistics of the historical wagers to statistics of a recent subset of wagers in the cohort; and a notification rules database stored on the cloud network and configured to store at least one relationship significance criteria and trend criteria.

12. The system for providing informational statistical data on a sports wagering network of claim 11, wherein the common characteristics are configured by an administrator or dynamically set by artificial intelligence.

13. The system of claim 11, wherein the notification is displayed on the mobile device as at least one of a popup or banner in a wagering application.

* * * * *